United States Patent
de la Broise et al.

(10) Patent No.: US 12,228,661 B2
(45) Date of Patent: Feb. 18, 2025

(54) DYNAMIC SELECTION AND MODIFICATION OF TRACKING DEVICE BEHAVIOR MODELS

(71) Applicant: Tile, Inc., San Mateo, CA (US)

(72) Inventors: Josselin de la Broise, Mountain View, CA (US); Aaron Okano, San Francisco, CA (US); Akhila Hegde, Fremont, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

(21) Appl. No.: 18/335,379

(22) Filed: Jun. 15, 2023

(65) Prior Publication Data

US 2023/0324495 A1 Oct. 12, 2023

Related U.S. Application Data

(63) Continuation of application No. 17/864,404, filed on Jul. 14, 2022, now Pat. No. 11,714,156, which is a
(Continued)

(51) Int. Cl.
*G08B 21/00* (2006.01)
*G01S 3/786* (2006.01)
(Continued)

(52) U.S. Cl.
CPC ............ *G01S 3/786* (2013.01); *G01S 5/0027* (2013.01); *G01S 19/34* (2013.01); *G01S 19/42* (2013.01);
(Continued)

(58) Field of Classification Search
CPC ........ G01S 3/786; G01S 5/0027; G01S 19/34; G01S 19/42; G06N 5/043; G06T 7/251;
(Continued)

(56) References Cited

U.S. PATENT DOCUMENTS 6,967,576 B2   11/2005   Hayes et al.
7,420,465 B2    9/2008   Ritter
(Continued)

OTHER PUBLICATIONS

United States Office Action, U.S. Appl. No. 15/640,456, Mar. 16, 2018, 7 pages.
(Continued)

*Primary Examiner* — Tai T Nguyen
(74) *Attorney, Agent, or Firm* — Fenwick & West LLP

(57) ABSTRACT

A tracking device broadcasts beacon signals that are separated in time by broadcast intervals. The tracking device determines the broadcast intervals based on a behavior model. The behavior model specifies one or more conditions, such as times of day within a 24-hour day, and associates a usage probability with each condition. A higher usage probability causes the tracking device to broadcast beacon signals at shorter broadcast intervals. A mobile device in communication with the tracking device can reconfigure the behavior model, either by modifying portions of the behavior model or by replacing the behavior model with a different behavior model. This allows the behavior model to adapt to different circumstances, such as different usage patterns during weekdays, weekends, and vacations.

20 Claims, 9 Drawing Sheets

Related U.S. Application Data continuation of application No. 17/129,922, filed on Dec. 22, 2020, now Pat. No. 11,422,221, which is a continuation of application No. 16/808,168, filed on Mar. 3, 2020, now Pat. No. 10,908,251, which is a continuation of application No. 16/401,580, filed on May 2, 2019, now Pat. No. 10,613,185, which is a continuation of application No. 16/109,325, filed on Aug. 22, 2018, now Pat. No. 10,345,425, which is a continuation of application No. 15/640,456, filed on Jul. 1, 2017, now Pat. No. 10,082,554.

(51) Int. Cl.

| | | |
|---|---|---|
| G01S 5/00 | (2006.01) | |
| G01S 19/34 | (2010.01) | |
| G01S 19/42 | (2010.01) | |
| G06N 5/043 | (2023.01) | |
| G06T 7/246 | (2017.01) | |
| G08B 21/04 | (2006.01) | |
| G08B 21/24 | (2006.01) | |
| H04W 4/02 | (2018.01) | |
| H04W 52/02 | (2009.01) | |
| H04W 64/00 | (2009.01) | |
| H04L 67/62 | (2022.01) | |
| H04W 52/00 | (2009.01) | |

(52) U.S. Cl.
CPC ............ *G06N 5/043* (2013.01); *G06T 7/251* (2017.01); *G08B 21/0423* (2013.01); *G08B 21/24* (2013.01); *H04W 4/025* (2013.01); *H04W 52/0229* (2013.01); *H04W 52/0254* (2013.01); *H04W 64/003* (2013.01); *H04L 67/62* (2022.05); *H04W 52/00* (2013.01)

(58) Field of Classification Search
CPC ... G08B 21/0423; G08B 21/24; H04W 4/025; H04W 52/0229; H04W 52/0254

USPC ..................................................... 340/539.13
See application file for complete search history.

(56) References Cited

U.S. PATENT DOCUMENTS

| | | |
|---|---|---|
| 2003/0096621 A1 | 5/2003 | Jana et al. |
| 2004/0087314 A1 | 5/2004 | Duncan |
| 2007/0282565 A1 | 12/2007 | Bye et al. |
| 2008/0051081 A1 | 2/2008 | Nelson |
| 2010/0144440 A1* | 6/2010 | Arrasvuori .............. A63F 13/30 463/1 |
| 2010/0179757 A1 | 7/2010 | Iketani et al. |
| 2011/0022312 A1 | 1/2011 | McDonough et al. |
| 2011/0171970 A1 | 7/2011 | Ishikawa |
| 2012/0130632 A1 | 5/2012 | Bandyopadhyay et al. |
| 2012/0270559 A1 | 10/2012 | Ingerson |
| 2013/0102283 A1 | 4/2013 | Lau et al. |
| 2014/0337862 A1* | 11/2014 | Valencia ................. G06F 21/45 719/313 |
| 2014/0378066 A1 | 12/2014 | Liu et al. |
| 2015/0005030 A1 | 1/2015 | Pennanen et al. |
| 2015/0121524 A1* | 4/2015 | Fawaz .................. G06F 21/552 726/23 |
| 2016/0150378 A1 | 5/2016 | Cui |
| 2016/0183029 A1 | 6/2016 | Kang et al. |
| 2016/0364549 A1 | 12/2016 | Wei et al. |
| 2019/0235092 A1 | 8/2019 | Bastian, II et al. |

OTHER PUBLICATIONS

United States Office Action, U.S. Appl. No. 16/401,580, Sep. 27, 2019, 6 pages.
United States Office Action, U.S. Appl. No. 16/808,168, Sep. 23, 2020, 6 pages.
United States Office Action, U.S. Appl. No. 17/129,922, Feb. 22, 2022, 7 pages.

\* cited by examiner

DYNAMIC SELECTION AND MODIFICATION OF TRACKING DEVICE BEHAVIOR MODELS

CROSS-REFERENCE TO RELATED APPLICATION

This application is a continuation of U.S. application Ser. No. 17/864,404, filed on Jul. 14, 2022, now U.S. Pat. No. 11,714,156, which is a continuation of U.S. application Ser. No. 17/129,922, filed on Dec. 22, 2020, now U.S. Pat. No. 11,422,221, which is a continuation of U.S. application Ser. No. 16/808,168, filed on Mar. 3, 2020, now U.S. Pat. No. 10,908,251, which is a continuation of U.S. application Ser. No. 16/401,580, filed on May 2, 2019, now U.S. Pat. No. 10,613,185, which is a continuation of U.S. application Ser. No. 16/109,325, filed on Aug. 22, 2018, now U.S. Pat. No. 10,345,425, which is a continuation of U.S. application Ser. No. 15/640,456, filed on Jul. 1, 2017, now U.S. Pat. No. 10,082,554 which is incorporated by reference in its entirety.

BACKGROUND

This disclosure relates generally to tracking devices, and more specifically, to the wireless configuration of tracking devices.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object (e.g., if it becomes lost).

Tracking devices have a limited power supply, and the tracking device consumes power in order to operate the features that allow a user to locate the attached object. By default, these tracking features can consume power at a constant rate, which can lead to the power supply being depleted more quickly.

SUMMARY

A tracking device broadcasts a first series of beacon signals via a communication interface and a transceiver of the tracking device. Consecutive beacon signals in the first series of beacon signals are separated in time by broadcast intervals or an average duty cycle determined based on a behavior model stored on the tracking device. The tracking device is capable of transmitting data to and receiving data from a mobile device over a communicative connection.

In one embodiment, the tracking device receives another behavior model over the communicative connection. The tracking device stores the additional behavior model on the tracking device and broadcasts a second series of beacon signals via the communication interface and the transceiver. Consecutive beacon signals in the second series of beacon signals are separated in time by broadcast intervals or at an average duty cycle determined based on the other behavior model.

In another embodiment, the tracking device receives a modification to the behavior model over the communicative connection. The tracking device modifies the behavior model in accordance with the received modification and broadcasts a second series of beacon signals via the communication interface and the transceiver. Consecutive beacon signals in the second series of beacon signals are separated in time by broadcast intervals or at an average duty cycle determined based on the modified behavior model.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a nearby object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
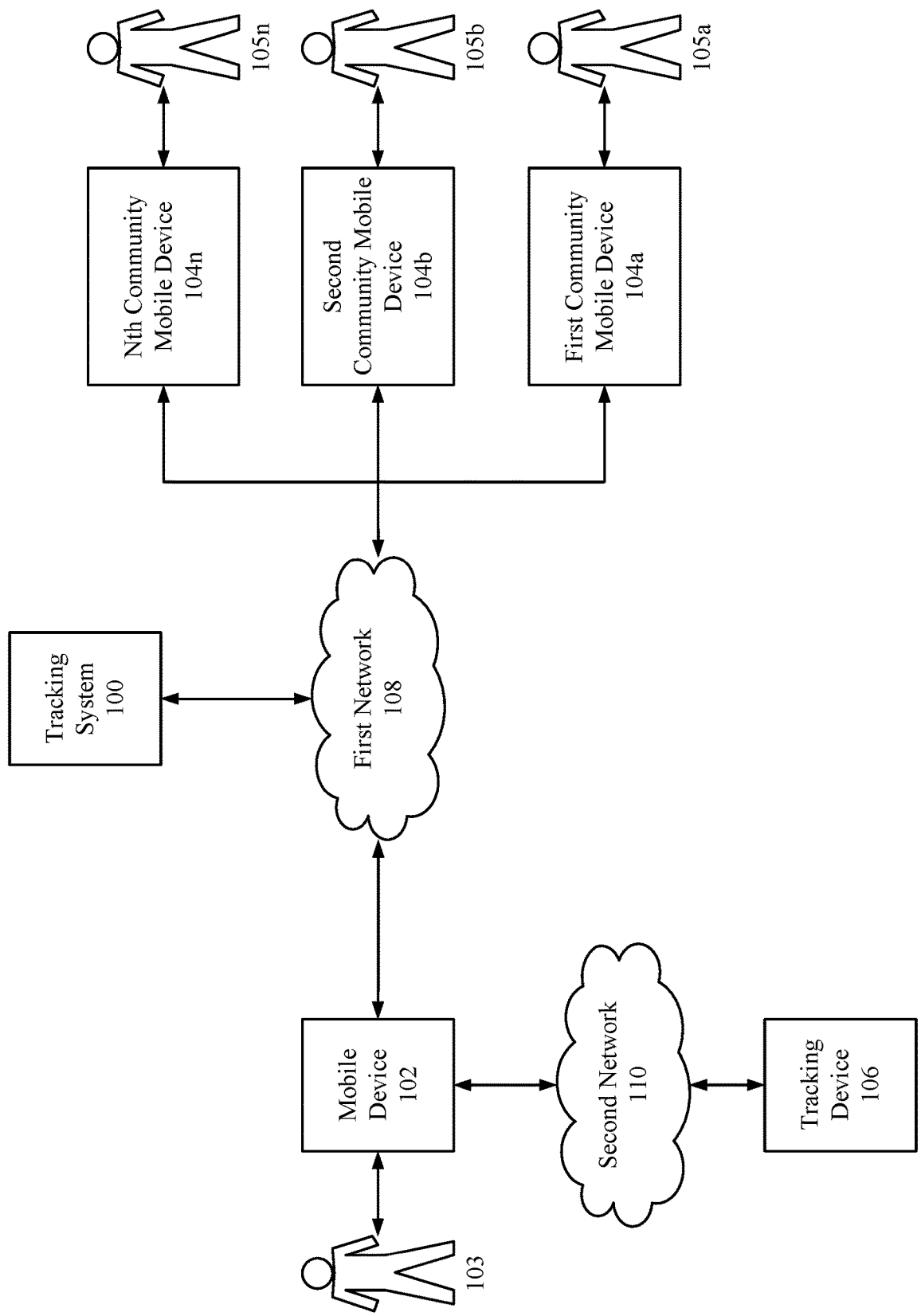
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device 106 can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon signal. In one configuration, the tracking device 106 may periodically broadcast a beacon signal that may be detected using a nearby mobile device 102 and/or community mobile device 104. In some configurations, the tracking device 106 broadcasts a beacon signal at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

Tracking System Overview

Figure 2:
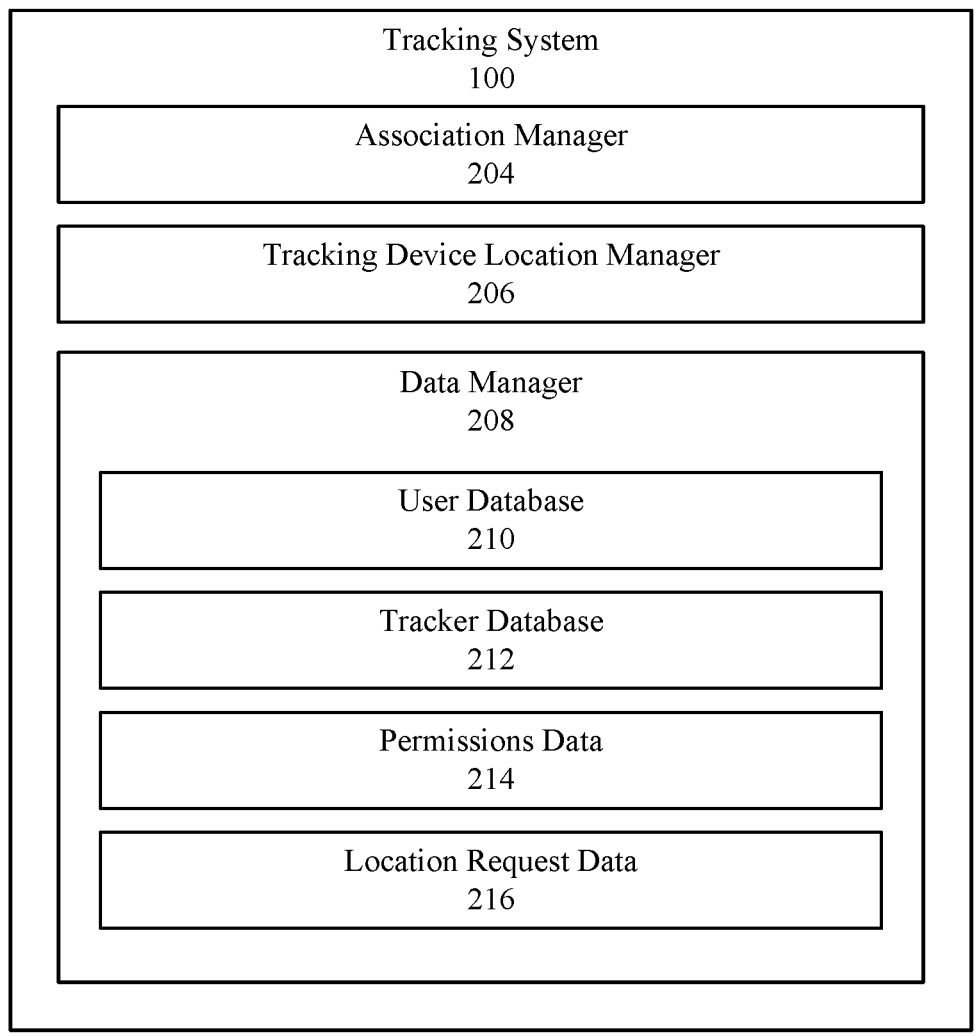
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal broadcast by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
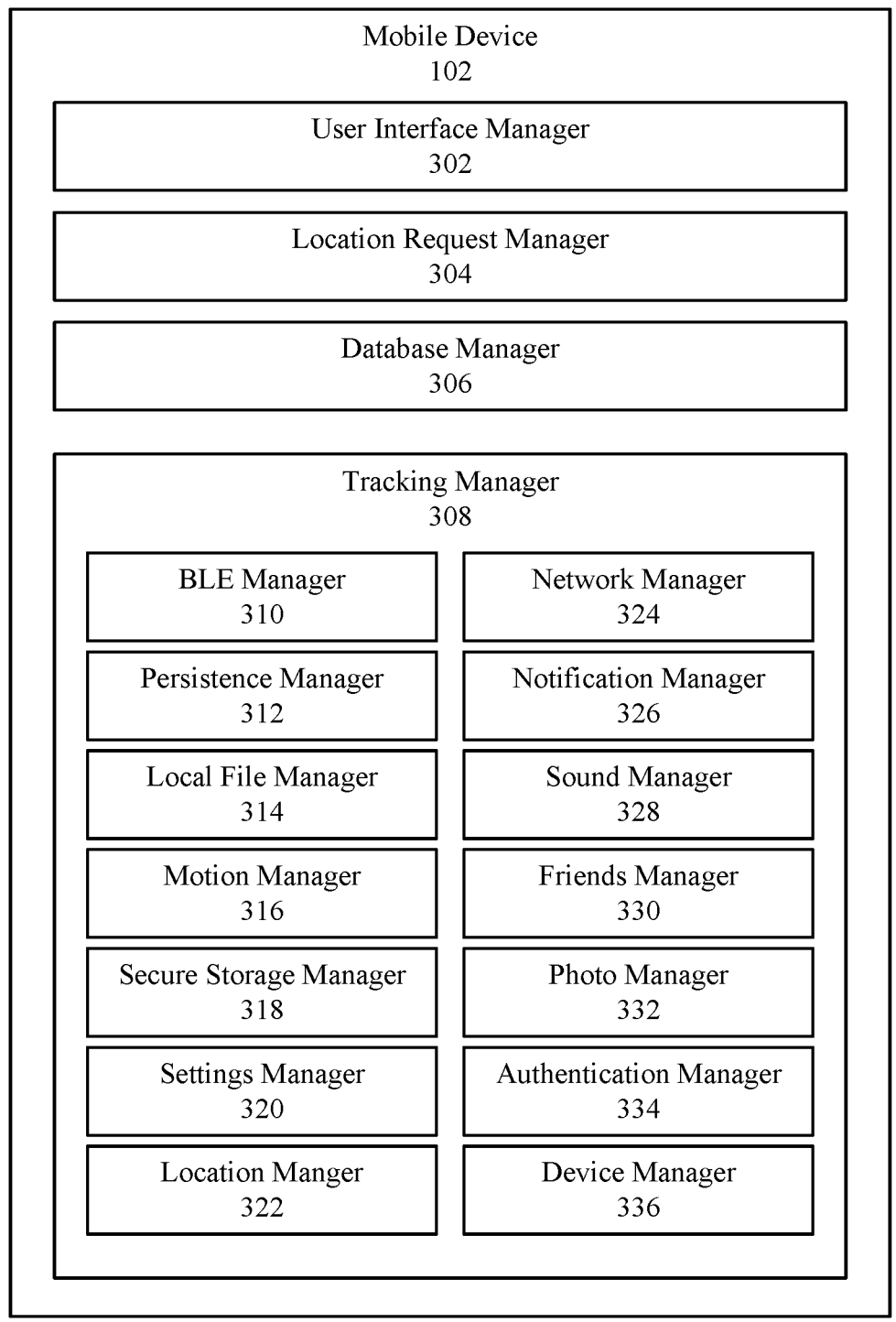
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
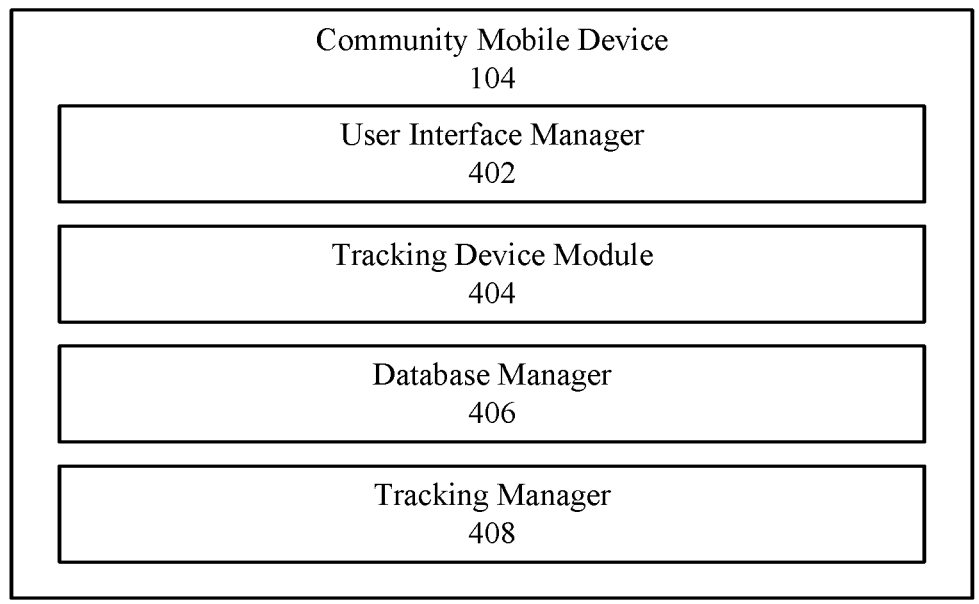
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
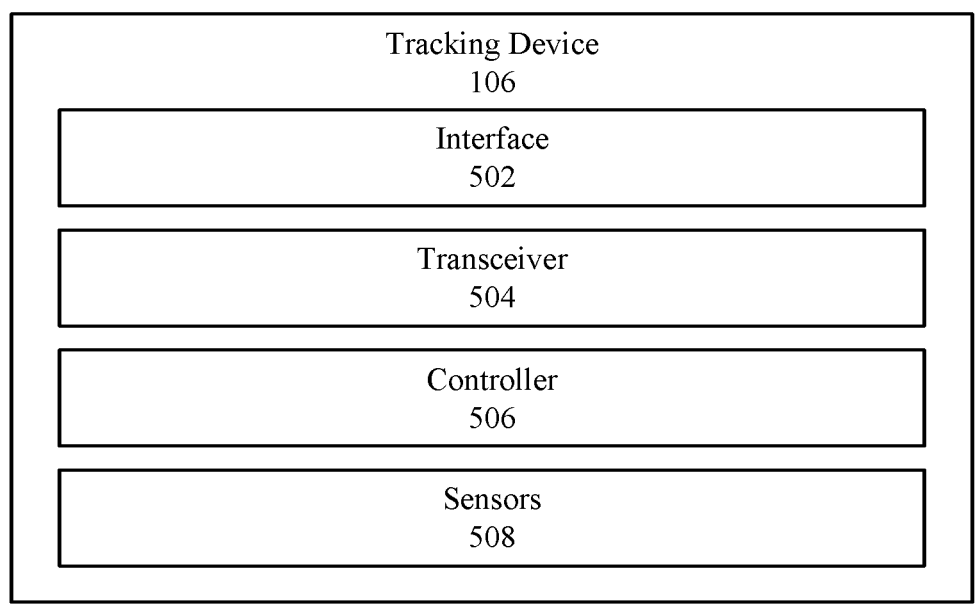
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to broadcast beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interface 502 to change the interval at which the transceiver 504 broadcasts beacon signals, can authorize or prevent particular devices from pairing with the tracking device 106 based on information received from the devices and permissions stored at the tracking device 106, can increase or decrease the transmission strength of signals broadcasted by the transceiver 504, can configure the interface 502 to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device 106 into a sleep mode or awake mode, can configure the tracking device 106 into a power saving mode, and the like.

The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), temperature sensors (such as thermocouples or thermistors), location sensors (such as a GPS receiver), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

Dynamic Selection and Modification of Tracking Device Behavior Models

As noted above, the tracking device broadcasts a beacon signal at regular intervals, and a mobile device or a community mobile device that detects the beacon signal can execute functions to help the owner of the tracking device locate the tracking device. This allows the user to find tracking devices that have been misplaced, lost, or stolen. One parameter that the tracking device manages is the average time interval between successive broadcasts of the beacon signal (i.e., the average duty cycle of the beacon signal). If the tracking device broadcasts the beacon signals with a shorter broadcast interval (i.e., a higher frequency), then a nearby mobile device or community mobile device is more likely to detect at least one of the beacon signals.

However, the tracking device also has a limited power supply, and each broadcast of the beacon signal consumes power, so a shorter broadcast interval also depletes the power supply of the tracking device more quickly. In embodiments where the power supply of the tracking device is not replaceable (e.g., a built-in battery that is not accessible by the user), the lifespan of the tracking device effectively ends when its power source is depleted. Thus, the broadcast interval for the beacon signal is subject to a tradeoff—a shorter broadcast interval may allow for a tracking device to be found more quickly but also causes the tracking device to deplete its power supply more quickly; meanwhile, a longer broadcast interval may cause a tracking device to be found less quickly, but it also consumes less power and thus can increase the lifespan of the tracking device.

One way to address this tradeoff is by configuring the tracking device to vary the broadcast interval of the beacon signal based on a behavior model. A behavior model specifies conditions under which the tracking device is more likely to be lost or more likely to undergo movement, such as time intervals corresponding to the user's commute, and associates those conditions with a higher usage probability. Similarly, the behavior model can also specify conditions under which the user is less likely to need to know a most recent location of the tracking device (e.g., conditions under which the tracking device is less likely to be lost or less likely to be moved) and associate those conditions with lower usage probabilities. The tracking device determines which one of the conditions is met and broadcasts beacon signals at a broadcast interval that is determined based on the associated usage probability.

A tracking device that only implements a single, unchanging behavior model may not fully account for the tracking device's entire range of activity. For example, a behavior model that associates the time intervals of 6 AM to 9 AM and 5 PM to 7 PM with a higher usage probability may accurately represent the tracking device's activity during a regular weekday when the user commutes to work but may not accurately represent the tracking device's activity during a weekend or on a day when the user is on vacation.

Rather than implementing a single behavior model that does not change, the tracking device operates in conjunction with the user's mobile device and the tracking system to dynamically select and switch to a new behavior model and/or dynamically modify the existing behavior model on the tracking device. The tracking system generates various new behavior models and modifications to behavior models. For example, the tracking system may generate separate behavior models for weekdays, weekends, and vacations that represent the tracking device's activity during weekdays, weekends, and vacations, respectively. Similarly, if usage data for a tracking device indicates that the tracking device regularly changes location between 2 PM and 3 PM on weekdays (e.g., because the user picks up his or her child from school every day), then the tracking system or the mobile device may generate a modification to the weekday behavior model of a tracking device to increase the usage during the time interval between 2 PM and 3 PM.

By switching between behavior models and/or modifying behavior models in this manner, the tracking device broadcasts beacon signals at broadcast intervals that are suited to the circumstances in which the tracking device is operating. More specifically, this method has the effect of dynamically reconfiguring the tracking device so that the tracking device broadcasts beacon signals more frequently in circumstances when it is more likely to get lost and less frequently in circumstances when it is less likely to get lost.

Figure 6A:
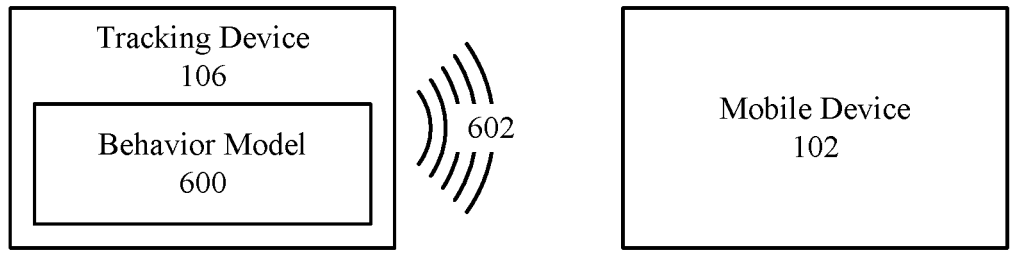
FIGS. 6A and 6B illustrate an example system environment for broadcasting beacon signals based on a tracking device behavior model, according to one embodiment.
Figure 6B:
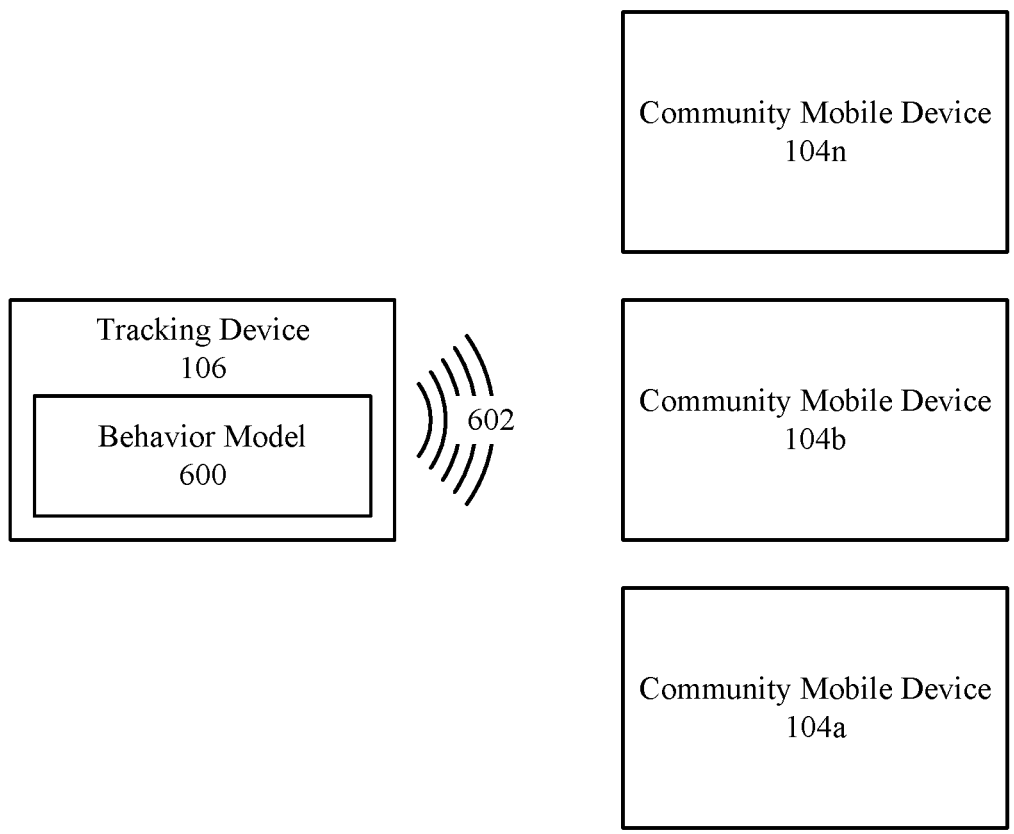

FIGS. 6A and 6B illustrate an example system environment for broadcasting beacon signals based on a tracking device behavior model, according to one embodiment. As noted above, a tracking device can broadcast beacon signals separated in time by broadcast intervals. As referred to herein, a beacon signal is a signal that is detectable by a mobile device or a community mobile device in proximity to the tracking device. In one embodiment, the beacon signal is a type of electromagnetic signal that is transmitted by the interface 502 via the transceiver 504 of the tracking device. For example, the interface 502 supports the Bluetooth Low Energy (BLE) protocol, and the beacon signal is a BLE advertisement. Alternatively, the beacon signal may be an electromagnetic signal broadcast via a different wireless protocol, such as a WiFi signal. In other embodiments, the beacon signal is a different type of signal, such as a sound signal (e.g., an ultrasonic signal that is imperceptible to humans but capable of being detected by a sensor on a mobile device or a community mobile device). In some embodiments, a tracking device identifier for the tracking device 106 or some other information about the tracking device 106 is embedded within the beacon signal 602.

Referring first to FIG. 6A, illustrated is a tracking device 106 broadcasting a beacon signal 602 in proximity to a mobile device 102 associated with the user of the tracking device 106. When the mobile device 102 detects the beacon signal 602, the mobile device 102 can indicate to the user (e.g., via a user interface provided by the user interface manager 302) that a tracking device 106 is nearby. As noted above, the mobile device 102 may also determine a degree of proximity between the mobile device 102 and the tracking device 106 based on a signal strength of the detected beacon signal 602 and display this degree of proximity to the user. In embodiments where a tracking device identifier for the tracking device 106 is embedded in the beacon signal 602, the mobile device 102 may also use the tracking device identifier to retrieve (e.g., from the tracking system 100 or from local storage on the mobile device 102) and display information associated with the tracking device 106 after detecting the beacon signal 602. For example, the information may include a description of the object to which the tracking device 106 is attached or a date on which the tracking device 106 was registered to the user. These tracking functions can help the user find the tracking device 106 and the object to which the tracking device 106 is attached in a situation where the user has lost or misplaced the object. The mobile device 102 may also establish a connection with the tracking device 106 (e.g., over the second network 110) after detecting the beacon signal 602, which allows the mobile device 102 to reconfigure the tracking device 106. For instance, the mobile device 102 may reconfigure the tracking device 106 by sending a different behavior model 600 to the tracking device 106 or by modifying the behavior model 600 on the tracking device 106, as described in further detail with reference to FIGS. 6C, 7, and 8.

The tracking device stores a behavior model 600. The behavior model 600 specifies one or more conditions and associates each condition with information describing the probability that the tracking functions of the tracking device 106 will be used under the associated condition (hereinafter referred to as a usage probability). In one embodiment, each condition specifies a time range in a 24-hour day (or some other time interval). For example, the behavior model 600 may specify a usage probability of 0.0001 for 12 AM to 6 AM, 0.2 for 6 AM to 9 AM, 0.01 for 9 AM to 11 AM, 0.1 for 11 AM to 2 PM, 0.01 for 2 PM to 5 PM, 0.2 for 5 PM to 7 PM, and 0.01 for 7 PM to 12 AM. This behavior model 600 may represent, for example, the usage probabilities for a tracking device 102 during a typical work day, with higher usage probabilities associated with time intervals when the user is likely to be commuting to work or taking a lunch break, and lower usage probabilities associated with time intervals when the user is working, home for the evening, or sleeping. In other embodiments, the behavior model 600 can specify different types of conditions, such as a velocity at which the tracking device 102 is traveling (e.g., higher usage probabilities associated with faster velocities), a location of the tracking device (e.g., higher usage probabilities associated with locations beyond a geofence surrounding the user's home), or an external temperature detected by the tracking device 102 (e.g., higher usage probabilities associated with temperatures corresponding to outdoor temperatures, such as temperatures beyond the range corresponding to typical indoor room temperatures). In addition to the usage probabilities associated with each condition, in some embodiments the behavior model 600 may also include a default usage probability that is used when none of the specified conditions are satisfied.

The tracking device 106 may include components that allow it to detect whether one or more of the conditions specified in the behavior model 600 is satisfied. For example, for a time range condition, the tracking device 106 may include an internal clock (e.g., implemented as part of the controller 506). If the conditions are velocities, then the tracking device 106 may include an accelerometer (e.g., as part of the sensors 508) and logic (e.g., implemented as part of the controller 506) to determine the velocity of the tracking device 106 based on the accelerometer data. Similarly, if the conditions are locations, then the tracking device 106 may include a location sensor (e.g., the sensors 508 may include a GPS receiver), and if the conditions are temperatures, then the tracking device 106 may include a temperature sensor (e.g., the sensors 508 may include a thermocouple or thermistor).

The tracking device 106 determines broadcast intervals for the beacon signal 602 based on the behavior model 600 and broadcasts the beacon signals 600 at the broadcast interval. As referred to herein, a broadcast interval is the average time elapsed between two consecutive broadcasts of the beacon signal 600. In other words, consecutive beacon signals are separated in time by broadcast intervals. In one embodiment, the broadcast interval is constant, which means consecutive beacon signals are separated by the same length of time. In another embodiment, the broadcast interval refers to an average duty cycle of the beacon signal, which means consecutive beacon signals may be separated by different lengths of time, but on average are separated by a length of time equal to the broadcast interval. In addition to the broadcast interval, the tracking device 106 can also determine other broadcast parameters (e.g., the transmit power) for the beacon signal 602 based on the usage probability. For example, the tracking device 106 can broadcast the beacon signal 602 with a higher transmit power for higher usage probabilities (i.e., because a higher usage probability indicates a higher likelihood that the tracking device 106 will get lost or undergo movement). The logic for determining the broadcast intervals and other broadcast parameters may be implemented, for example, on the controller 506 or on some other component of the tracking device 106.

The tracking device 106 determines broadcast intervals by performing two steps. First, the tracking device 106 reads data from the relevant components to determine which set of conditions (if any) specified in the behavior model 600 are satisfied and identify the usage probability associated with the satisfied condition (hereinafter referred to as the active usage probability). For example, if the conditions specified in the behavior model 600 are time ranges, then the tracking device 602 reads a clock implemented in the tracking device 602 to determine the current time and determines the time range that corresponds to current time. After determining the time range that corresponds to the current time, the tracking device 602 identifies the usage probability associated with the time range as the active usage probability. Second, the tracking device 106 determines the broadcast interval based on the current usage probability. For example, in an embodiment where the behavior model 600 specifies conditions in the form of time ranges, the tracking device determine the broadcast interval according to the following equation:

$$\text{broadcast interval} = \frac{\text{average usage probability per day}}{\text{active usage probability}} * (\text{base interval}).$$

In other embodiments, the tracking device 106 may determine the broadcast interval in some other manner, such as by multiplying or dividing the active usage probability by a constant scalar value. In an embodiment where the behavior model 600 also specifies a default usage probability, the tracking device 106 identifies the default usage probability as the active usage probability (and thus determines the broadcast interval based on the default usage probability) if none of the specified conditions in the behavior model 600 are satisfied.

In one embodiment, the method by which the broadcast interval is determined also accounts for the amount of remaining power in the power source of the tracking device 106 (e.g., if the power source is close to being depleted, the broadcast intervals are longer in order to reduce overall power consumption). For example, in the equation provided above, the value for the base interval may be increased as the amount of remaining power decreases. As another example, the default usage probability mentioned above may be decreased (to yield a longer broadcast interval) as the amount of remaining power decreases.

The tracking device 106 may also additionally or alternatively determine other broadcast parameters for the beacon signal 602 based on the active usage probability. In one embodiment, the tracking device 106 determines the amplitude of the beacon signal 602 and/or the frequency modulation of the beacon signal 602 based on the active usage probability. For example, the tracking device 106 broadcasts the beacon signal 602 at higher amplitudes for higher usage probabilities and lower amplitudes for lower usage probabilities. In an embodiment where the beacon signal 602 is a WiFi signal (which includes a plurality of data packets), the tracking device 106 may also select a mode of sending the data packets (e.g., burst mode, packet mode, etc.) based on the active usage probability. For example, the tracking device 106 may select a mode that consumes more power for a higher usage probability.

The tracking device 106 may also select a pattern for the data of the beacon signal 602 based on the active usage probability. For instance, for lower usage probabilities, the tracking device 106 may broadcast a beacon signal 602 that primarily (or exclusively) includes 0's rather than 1's because less power is consumed by broadcasting a 0. The tracking device 106 can also determine a variety of other broadcast parameters based on the active usage probability, such as the transmit strength of the beacon signal 602 (e.g., a higher transmit strength for a higher usage probability) and the number of channels on which the beacon signal 602 is transmitted (e.g., a larger number of channels for a higher usage probability).

The tracking device 106 can also determine broadcast parameters for the beacon signal 602 based on data separate from the behavior model 600. For example, the tracking device 106 may decrease the broadcast interval (i.e., increase the frequency of beacon signal broadcasts) and/or increase the transmit strength of the beacon signal 602 after detecting that: the connection between the tracking device 106 and the mobile device 102 (i.e., over the second network 110) was severed; a user has pressed a physical button on the tracking device 106; the tracking device 106 is being moved (e.g., according to data from an accelerometer in the sensors 508); the temperature of the environment surrounding the tracking device 106 has changed (e.g., according to data from a temperature sensor in the sensors 508).

Referring next to FIG. 6B, illustrated is a tracking device 106 broadcasting a beacon signal 602 that is detectable by multiple community mobile devices 104a through 104n (hereinafter referred to collectively as community mobile devices 104). As noted above, the tracking system 100 can leverage the capabilities of the community mobile devices 104 when a user has marked a tracking device 106 as lost. In particular, the tracking device 106 continues to broadcast beacon signals 602 based on the behavior model even if it is no longer in proximity to the user's mobile device 102 (e.g., when the tracking device has been misplaced, lost, or stolen and removed from the proximity of the mobile device 102).

When one of the community mobile devices 104 detects a beacon signal 602 from the tracking device 106, the community mobile device 104 can obtain the tracking device identifier for the tracking device 106 (e.g., by reading the tracking device identifier embedded in the beacon signal 602 or by establishing a connection with the tracking device 106 and receiving the tracking device identifier over the connection) and send the tracking system 100 a query to determine whether the identified tracking device 106 has been flagged as lost. If the tracking device 106 has been flagged as lost, the tracking system 100 can associate a current location of the community mobile device 104 with the tracking device 106 and send the location to the user of the tracking device 106. This advantageously allows the user to receive the location of a tracking 106 that has been misplaced, lost, or stolen as long as one or more community mobile devices 104 have detected a beacon signal 602 broadcast by the tracking device 106.

Figure 6C:
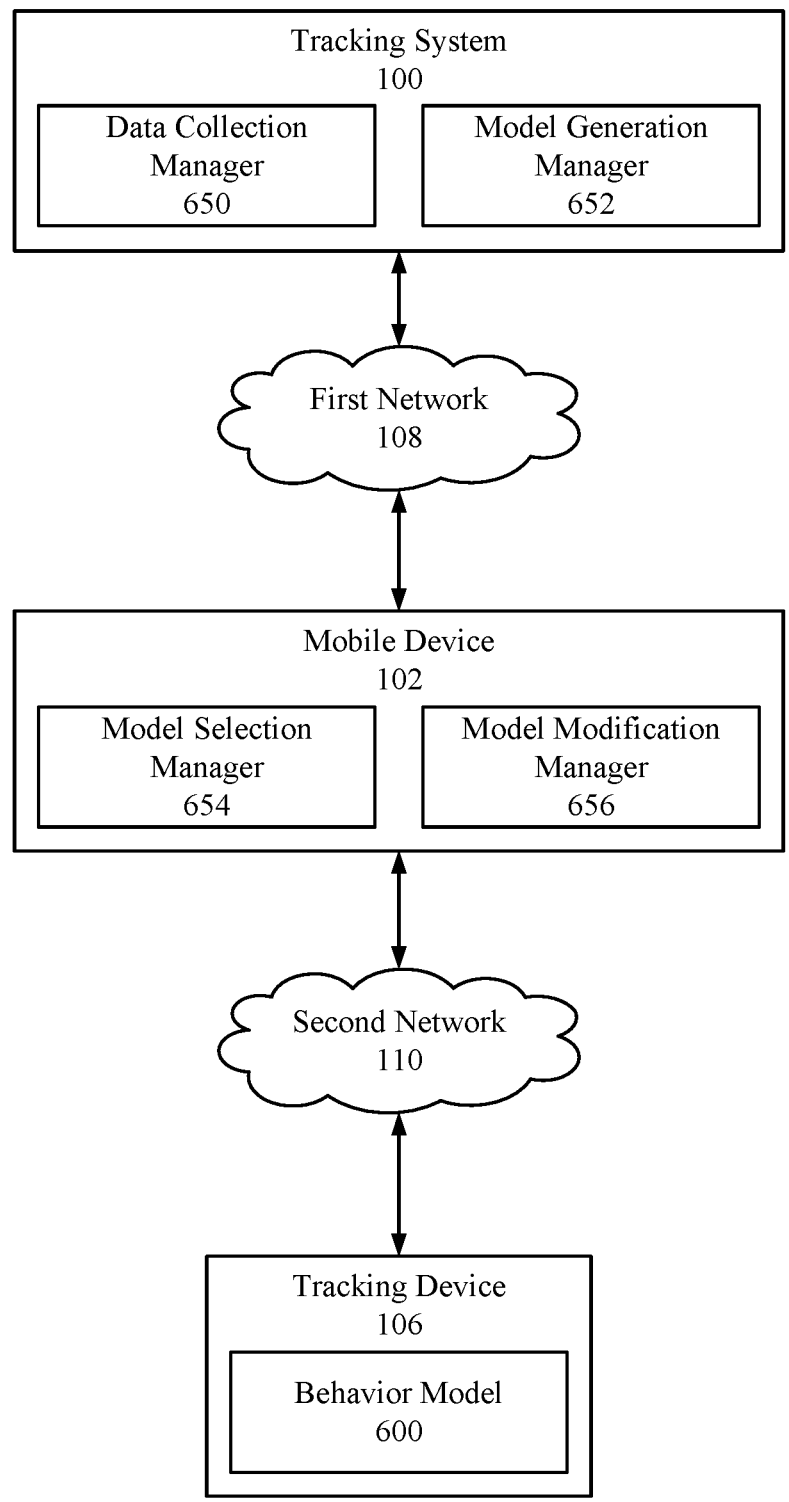
FIG. 6C illustrates an example system environment for dynamic selection and modification of tracking device behavior models, according to one embodiment.

FIG. 6C illustrates an example system environment for dynamic selection and modification of tracking device behavior models, according to one embodiment. As shown in FIG. 6C, the system environment includes the tracking system 100, the mobile device 102, and the tracking device 106. The tracking system 100 and the mobile device 102 communicate with each other over the first network (e.g., the Internet), and the mobile device 102 and the tracking device 106 communicate with each other over the second network 110 (e.g., a Bluetooth Low Energy connection). Although only one mobile device 102 and one tracking device 106 are shown, the tracking system 100 may be in communication with a plurality of mobile devices 102, and each mobile device 102 may be in communication with a plurality of tracking devices 106.

In addition to the components shown in FIG. 2, the tracking system 100 can also include a data collection manager 650 and the model generation manager 652. The data collection manager 650 and the model generation manager 652 operate together to collect usage data from users of the tracking system 100 and to generate new behavior models and/or modifications to existing behavior models.

The data collection manager 650 collects usage data for a plurality of users and provides the usage data as input to the model generation manager 652. The usage data includes tracking device data describing usage patterns for tracking devices 106 belonging to one or more users. In one embodiment, the tracking device data includes timestamped location data describing the locations of tracking devices 106 at various times and dates. The tracking device data may further include an object descriptor for the type of object to which a tracking device 106 is attached. For example, the tracking device data for one tracking device 106 may include a series of timestamped locations (e.g., latitude and longitude coordinates) and a descriptor indicating that the tracking device 106 is attached to the user's car keys. The data collection manager 650 may receive and compile data in this format for a large number of tracking devices 106 that are attached to various types of objects. In one embodiment, the tracking device data for a user's tracking devices 106 is collected by a software application on the user's mobile devices 102 (e.g., the tracking manager 308), and the mobile devices 102 send the tracking device data to the data collection manager 650. For example, the timestamped location data may be collected from a location sensor (e.g., a GPS receiver) in the mobile device 102, and the object descriptor may be received via user input on the mobile device 102.

The usage data may additionally include other types of data. For example, the usage data may include mobile device data specifying information about the mobile devices 102 belonging to one or more users of the tracking system 100. Mobile device data may include, for example, configuration information about users' mobile devices 102, such as the make, model, and operating system of one or more mobile devices 102, or location data describing the locations of mobile devices 102. Mobile device data may be collected, for example, by a software application on the mobile device 102.

The usage data may also include user profile data specifying information about users of the tracking system 100. User profile data may include, for example, locations associated with the user, such as the user's current place of residence or city of residence, or the user's current profession. The user profile data can be obtained, for example, from user profiles maintained by the tracking system 100. In one embodiment, users of the tracking system 100 are given the option to grant the tracking system 100 access to their user profiles on a third-party system (e.g., a social networking platform such as FACEBOOK), and user profile data for users may additionally or alternatively be obtained from the third-party system.

In various embodiments, the tracking system 100 and/or the mobile device 102 provide one or more user interfaces that allow the user to adjust his or her privacy settings to allow, limit, or disallow the collection of any of the data collected by the data collection manager 650, and/or to set limitations on how the collected data is used by the tracking system 100.

The model generation manager 652 receives usage data from the data collection manager 650 and uses the usage data to generate new behavior models or modifications to behavior models. As referred to herein, a new behavior model has the same structure as the behavior models described above with reference to FIG. 6A. Thus, each new behavior model specifies one or more conditions (e.g., time intervals in a 24-hour day) and associates a usage probability with each condition. As referred to herein, a modification to a behavior model specifies one or more changes to an existing behavior model. For example, a modification may specify that a usage probabilities associated with one or more conditions be increased or decreased by a specific amount or a specific percentage. A modification may additionally or alternatively specify a change to one or more of the conditions. For example, if the conditions are time intervals in a 24-hour day, then a modification may adjust the lengths of some or all of the time intervals.

The model generation manager 652 also assigns one or more triggering conditions to each behavior model and modification that the manager 652 generates, and the mobile devices 102 are configured to switch to a particular behavior model or apply a particular modification when the assigned triggering conditions are satisfied. Triggering conditions can specify a time, date, day of week, location, or any other parameter that one of the mobile devices 102 is capable of detecting. A triggering condition may also specify that the model or modification be applied once the model or modification is generated. For instance, once the model generation manager 652 generates a new behavior model (e.g., because the manager 652 has recognized some type of activity pattern based on one or more of the techniques described below), the tracking system 100 sends the new behavior model to one or more mobile devices 102, and the mobile devices 102, in turn, reconfigure one or more connected tracking devices 106 by applying the new behavior model.

The model generation manager 652 uses various techniques to infer activity patterns from the usage data and generate new behavioral models or modifications to behavioral models based on those activity patterns. As referred to herein, an activity pattern specifies aggregate activity levels for tracking devices 106 that have a common characteristic, such as being located in a common location or being attached to the same type of object. An activity pattern may specify different activity levels under different conditions, such as different times of day or days of the week. Alternatively, an activity pattern may simply specify a single aggregate activity level.

In one embodiment, the model generation manager 652 uses location-based usage data, such as timestamped locations for tracking device 106 and mobile devices 102, to determine an activity pattern for a geographic area. For instance, the model generation manager 652 may use location-based usage data to determine a likelihood that a tracking device 106 in the geographic area will be moved at various times of day or on different days of the week. For example, the model generation manager 652 may determine that tracking devices 106 in a town with a large university are likely to be motionless between 2 AM and 9 AM and likely to be in motion from 8 PM to 2 AM because university students tend to socialize in the evening, go to bed late, and wake up late. Meanwhile, the model generation manager 652 may determine that tracking devices 106 in a suburban community are likely to be motionless between 12 AM and 6 AM and likely to be in motion from 6 AM to 9 AM and 5 PM to 7 PM because people who live in the suburbs typically commute to work and maintain regular sleep schedules.

The model generation manager 652 uses the activity pattern for a geographic area to generate a behavior model associated with the geographic area. In one embodiment, the behavior model generated for a geographic area associates higher usage probabilities with time intervals during which a tracking device 106 is more likely to be in motion. For example, the behavior model generated for the town described above associates a high usage probability with the time interval from 8 PM to 2 AM and a low usage probability with the time interval from 2 AM to 9 AM. The model generation manager 652 may alternatively use the activity pattern to generate a modification to an existing behavior model based on the same principles. For instance, the generated modification may specify that the usage probabilities associated with the time interval 8 PM to 2 AM be changed to a different value (e.g., a fixed value or an increase by a fixed percentage amount) whereas the usage probabilities associated with other time intervals remain unchanged.

The model generation manager 652 also assigns one or more triggering conditions associated to each area-specific model or modification. For example, the triggering conditions may specify that that the model or modification be applied after a tracking device 106 has entered the geographic area, or after a tracking device 106 has remained in the geographic area for a predetermined length of time.

The model generation manager 652 may also use location-based usage data to identify locations with an especially high concentration of community mobile devices. This can be useful, for example, because a beacon signal that is broadcast in a location with a higher concentration of community mobile devices is more likely to be detected by at least one community mobile device, so the broadcast interval for a tracking device 106 in one of these locations can be increased (i.e., the broadcast frequency can be decreased) to save power. In one embodiment, the model generation manager 652 generates a modification that specifies a fixed increase (e.g., a fixed percentage or a fixed amount) to each usage probability in the behavior model and assigns a triggering condition that causes the modification to be applied if the tracking device enters a specified location (e.g., as defined by a geofence). The model generation manager 652 may also generate a location-specific behavior model for a location with a high concentration of community mobile devices and assign a similar triggering condition to the model.

The model generation manager 652 may also determine an activity pattern for specific types of objects. For example, the model generation manager 652 receives usage data specifying a series of timestamped locations (e.g., latitude and longitude coordinates) for each of a plurality of tracking devices that have all been attached to the same type of object. Based on this usage data, the model generation manager 652 generates an activity pattern for the type of object that maps different times of day to different levels of activity. This is advantageous, for example, because different types of objects may experience different levels of activity throughout the day. For instance, car keys or mobile phones are likely to follow an activity pattern similar to a user's daily movements because a user is likely to carry these objects with him or her throughout the day. In contrast, a remote control is likely to have a higher activity level in evenings, and a lower overall activity level, because it typically remains near a user's television and is most likely to be used when the user is home for the evening.

After determining an activity pattern for a type of object, the model generation manager 652 may generate a behavior model for the object type. For example, the behavior model associates higher usage probabilities with times of day corresponding to higher activity levels. The model generation manager 652 also assigns triggering conditions to the behavior model. In one embodiment, the triggering condition for an object-specific behavior is satisfied when a user specifies, via user input, that a tracking device 106 has been attached to the same type of object. For example, the model generation manager 652 generates a behavior model for tracking devices 602 that are attached to car keys and assigns, to the behavior model, a triggering condition that is satisfied once a user configures a tracking device to designate it as being attached to car keys.

The model generation manger 652 may also determine activity patterns specific to a user based on usage data describing the user's day-to-day movements, such as location data from the user's mobile device 102 or one or more tracking device 106 that are attached to objects that users typically carry with them (e.g., car keys, wallets, mobile phones). This allows the model generation manager 652 to generate activity patterns that reflect the user's daily and weekly routine. For example, the model generation manager 652 can determine activity patterns that describe the times the user typically commutes to and from work, the times and days of the user's regularly scheduled activities and errands (e.g., picking up a child from school, evening classes, attending religious services). The model generation manager 652 can generate one or more new behavior models or modifications to existing behavior models to reflect these user-specific activity patterns.

The model generation manager 652 may additionally or alternatively apply the process described above to determine activity models specific to a tracking device 106 (rather than specific to a user) and generate new behavior models or modifications based on an object-specific activity pattern. In one embodiment, the model generation manager 652 receives timestamped location data for a single tracking device 106, determines activity patterns that reflect the times during a day or week at which the tracking device 106 undergoes regular movement, and generates a model with higher usage probabilities during those times and/or a modification that increases the usage probabilities during those times. For example, if the usage data for a tracking device 106 attached to a dog indicates that the dog remains at a location corresponding to the user's home for most of the day but travels around the neighborhood once in the morning and once in the evening (e.g., the dog is taken for a walk twice per day), then the model generation manager 252 generates a new model with higher usage probabilities at in the morning and evening or a modification that increases the usage probabilities during those times.

The model generation manager 652 assigns triggering conditions for user-specific and object-specific models and modifications. In one embodiment, the triggering condition for a user-specific or object-specific model or modification is satisfied once the usage data indicates that an activity has been repeated a threshold number of times at the same time of day, the same day of the week, or at some other regular interval. For example, suppose the threshold for the triggering condition is three times. In this example, if a user walks his dog from 8:00 AM to 8:30 for three days in a row, then the triggering condition is satisfied and the behavior model for the tracking device 106 attached to the dog is replaced with a new model or updated with a modification that specifies a higher usage probability for the half-hour between 8:00 AM and 8:30 AM.

Although the generation of user-specific and object-specific behavior models and modifications is described above as taking place on the tracking system, some or all of these functions and the associated data collection functions may instead be implemented on the mobile device 102. For example, the mobile device 102 records location-based usage data for the mobile device 102 itself and for one or more tracking devices 106 in communication with the mobile device 102 and generates a new behavior model 600 for one of the tracking devices 106 (or a modification the behavior model 600 on one of the tracking devices 106) if the usage data indicates a recurring activity pattern.

In addition to automatically generating models and modifications based on usage data, models and modifications can also be created manually and stored on the tracking system 100. For example, models and modifications could be created by an operator of the tracking system 100 or by various users of the tracking system 100. This may be especially useful, for example, for generating an initial set of behavior models for common use cases, such as workdays, weekends, and vacations.

The mobile device 102 includes a model selection manager 654 and a model modification manager 656. The model selection manager 654 determines whether triggering conditions for any of the behavior models generated by the tracking system 100 have been satisfied. Upon determining that the triggering conditions for a behavior model have been satisfied, the model selection manager 654 sends the behavior model to the tracking device 106 over the second network 110, and the tracking device 106 stores the new behavior model 600.

The model modification manager 656 implements functions similar to those of the model selection manager 654, but for modifications to behavior models rather than for new behavior models. Thus, the model modification manager 656 determines whether triggering conditions for any of the modifications generated by the tracking system 100 have been satisfied, and upon determining that the triggering conditions for a modification have been satisfied, the model modification manager 656 sends the modification to the tracking device 106 so that the tracking device can modify the behavior model 600 accordingly.

The model modification model 656 can also generate user-specific or model-specific modifications based on usage data collected from the mobile device 102 or from tracking devices 106 in communication with the mobile device 102. In one embodiment, the model modification manager 656 recognizes user-specific and object-specific activity patterns and generates modifications to reflect those activity patterns. For example, if the model modification manager 656 determines that a tracking device 106 attached to the user's wallet frequently undergoes movement between 8 AM and 10 AM, the model modification manager 656 may generate and apply a modification to the behavior model 600 on the tracking device 106 to increase the usage probability for the time interval that extends from 8 AM to 10 AM.

Figure 7:
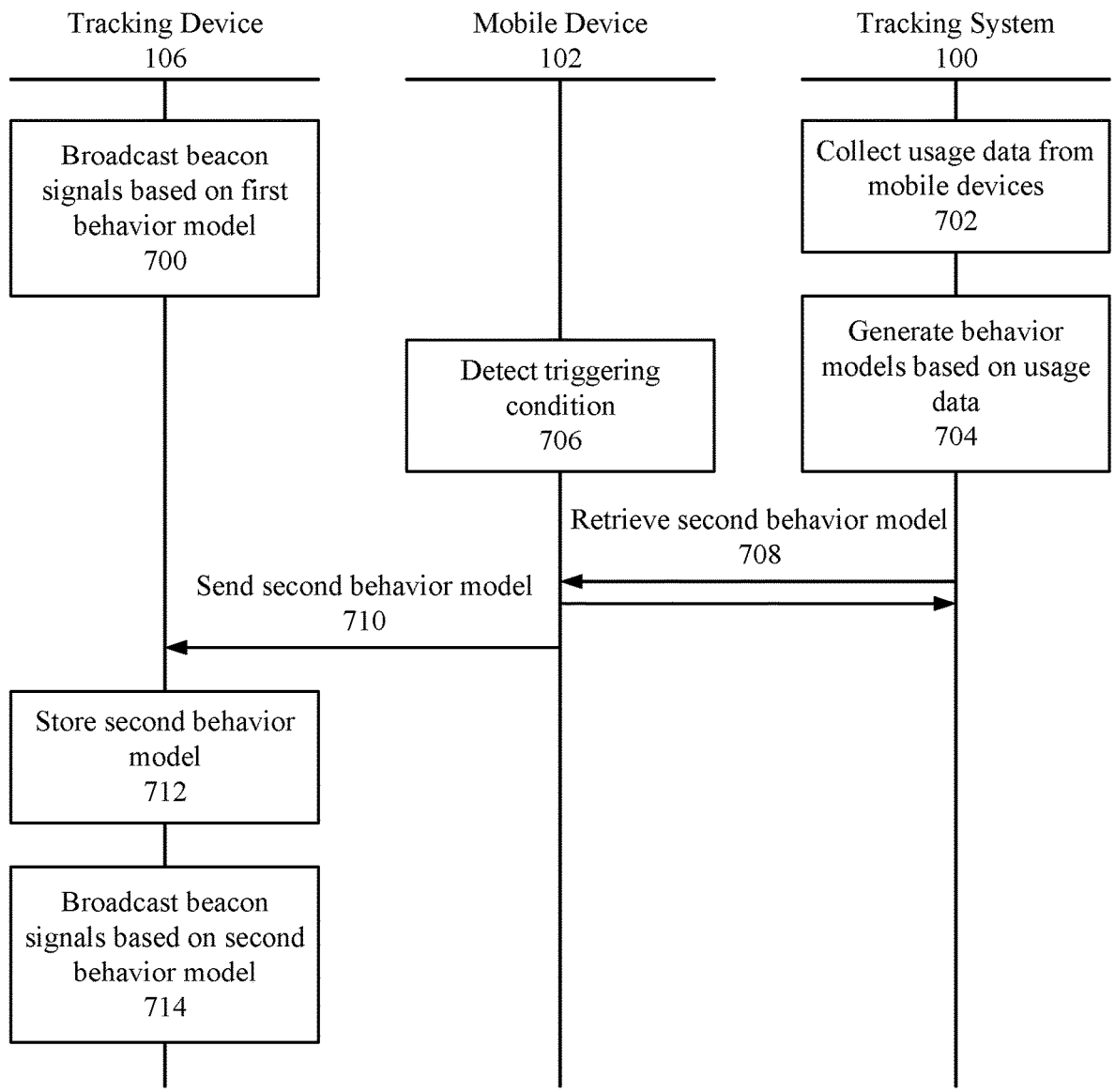
FIG. 7 is an interaction diagram illustrating an example method for dynamic selection of tracking device behavior models, according to one embodiment.

FIG. 7 is an interaction diagram illustrating an example method for dynamic selection of tracking device behavior models, according to one embodiment. The tracking device 106 broadcasts 700 beacon signals based on a first behavior model. As noted above, the tracking device 106 stores a behavior model, determines broadcast intervals based on the behavior mode, and broadcasts beacon signals separated in time by the broadcast intervals. In one embodiment, the controller 506 of the tracking device 106 determines the broadcast intervals and communicates with the interface 502 to broadcast the beacon signals via the transceiver 504.

The tracking system 100 collects 702 usage data from one or more mobile devices and generates 704 one or more new behavior models based on the usage data. The tracking system 100 also assigns triggering conditions to each new behavior model. When the mobile device 102 detects 706 that the triggering conditions for one of the new behavior models has been satisfied, the mobile device 102 sends 710 the new behavior model (hereinafter referred to as the second behavior model) to the tracking device 106. For example, the mobile device 102 sends 710 the second behavior model to the tracking device 106 over the second network 110 (e.g., a Bluetooth Low Energy connection). In the embodiment shown in FIG. 7, the mobile device 102 retrieves 708 the second behavior model upon detecting 706 that the triggering condition for the second behavior model has been satisfied, and the mobile device 102 sends 710 the second behavior model to the tracking device 106 in response to receiving the second behavior model from the tracking system 100. In another embodiment, the tracking system 100 sends a plurality of new behavior models to the mobile device in addition to the triggering conditions for the behavior models, and the mobile device 102 does not retrieve 708 the second behavior model from the tracking system 100 after detecting 706 that the corresponding triggering condition has been satisfied.

After the tracking device 106 receives the second behavior model, the tracking device 106 stores the second behavior model 712. In one embodiment, the tracking device 106 stores the second behavior model by overwriting the first behavior model. In another embodiment, the tracking device 106 is capable of storing multiple behavior models at once, and the second behavior model is stored 712 without overwriting the first behavior model. In an embodiment where the tracking device 106 stores multiple behavior models, the tracking device 106 may also be configured to detect whether triggering conditions for the stored behavior models are satisfied and automatically switch to a different stored behavior model in response to the triggering conditions for the behavior model being satisfied. For example, one of the stored behavior models may be a "lost mode" model whose triggering condition is satisfied if the tracking device 106 has not communicated with the mobile device 102 for a predetermined length of time (i.e., when the tracking device 106 has been physically separated from the mobile device). The "lost mode" model may, for example, specify usage probabilities that cause the tracking device 106 to broadcast beacon signals at a lower broadcast interval and a higher transmit power to increase the likelihood of the beacon signals being detected.

The tracking device 106 begins to broadcast 714 beacon signals based on the second behavior model after the second behavior model has been stored 712 on the tracking device. In one embodiment, the tracking device 106 broadcasts 714 beacon signals based on the second behavior model in the same manner as the first behavior model. For example, the controller 506 of the tracking device 106 determines broadcast intervals based on the usage probabilities in the second behavior model and communicates with the interface 502 to broadcast the beacon signals via the transceiver 504.

In other embodiments, some of the steps shown in FIG. 7 may be performed on different devices, and some of the steps may be omitted. For example, as noted above, the mobile device 102 may generate 704 certain behavior models based on usage data collected 702 from the mobile device 102 itself and from one or more tracking devices 106 in communication with the mobile device). As another example, the step of broadcasting 700 beacon signals based on the first behavior model may be omitted. For instance, the remaining steps 702 through 714 of the method shown in FIG. 7 may take place to select and store an initial behavior model on the tracking device 106 when the tracking device 106 is configured for the first time after it is purchased by the user.

Figure 8:
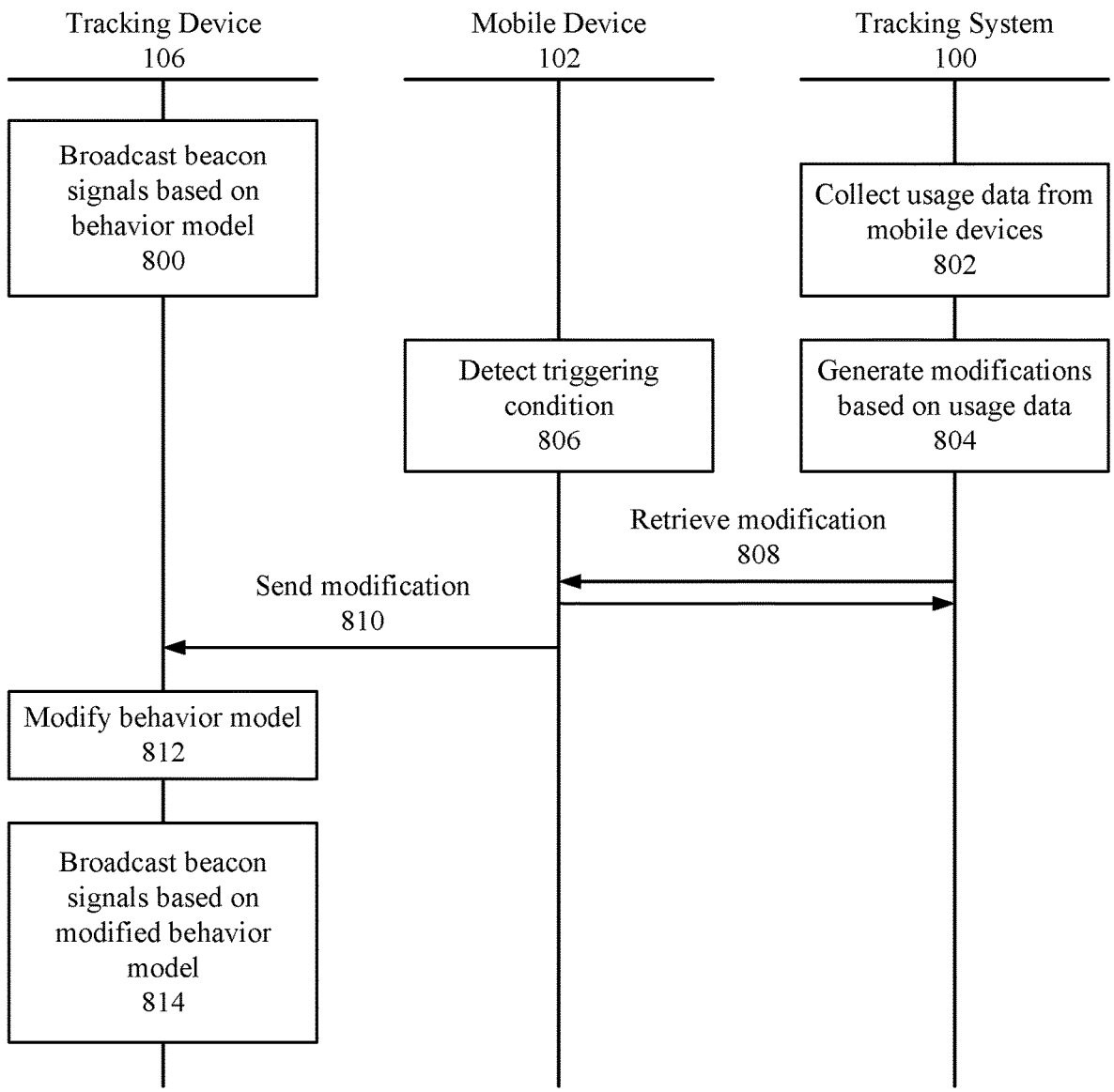
FIG. 8 is an interaction diagram illustrating an example method for dynamic modification of tracking device behavior models, according to one embodiment.

FIG. 8 is an interaction diagram illustrating an example method for dynamic modification of tracking device behavior models, according to one embodiment. The tracking device 106 broadcasts 800 beacon signals based on a behavior model stored on the tracking device 106. Again, the controller 506 of the tracking device 106 determines broadcast intervals based on the usage probabilities in the behavior model and communicates with the interface 502 to broadcast the beacon signals via the transceiver 504.

The tracking system 100 collects 802 usage data from one or more mobile devices, generates 804 modifications based on the usage data, and assigns triggering conditions to each modification. When the mobile device 102 detects 806 that a triggering condition for a modification has been satisfied, the mobile device 102 sends 810 the modification to the tracking device (e.g., over the second network 110). In the embodiment shown in FIG. 8, the mobile device 102 retrieves 808 a modification from the tracking system 100 upon detecting that the triggering conditions for the modification have been satisfied, and then sends 810 the modification in response to receive the modification from the tracking system 100. In another embodiment, the mobile device 102 receives one or more modifications and their assigned triggering conditions from the tracking system 100 and sends 810 a modification to the tracking device 106 in response to detecting 806 that the triggering conditions for the modification have been satisfied.

After the tracking device 106 receives the modification from the mobile device 102, the tracking device 106 modifies 812 the behavior model according to the modification. As noted above, a modification specifies one or more changes to a behavior model, such as a change to one or more conditions specified by the behavior model (e.g., a change to the lengths of one or more time intervals) and/or a change to the usage probabilities associated with one or more of the conditions. The tracking device 106 makes the changes specified in the modification and then begins to broadcast 814 beacon signals based on the modified behavior model 814.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
accessing, by a tracking system, usage data corresponding to a tracking device and describing a behavior of the tracking device;
training, by the tracking system, a behavior model corresponding to the tracking device and configured to predict a probability that a tracking device will be moved during each of one or more time intervals based on the accessed usage data; and
retraining, by the tracking system, the behavior model in response to receiving updated usage data corresponding to change in behavior of the tracking device, the updated usage data satisfying a triggering condition associated with retraining the behavior model.

2. The method of claim 1, wherein the behavior model is trained based on timestamped locations of the tracking device during a preceding time interval.

3. The method of claim 2, wherein the timestamped locations of the tracking device are collected from a location sensor in a mobile device communicatively coupled to the tracking device.

4. The method of claim 1, wherein the behavior model is trained based on an object descriptor specifying a type of object to which the tracking device is attached.

5. The method of claim 1, wherein the tracking device belongs to a user of the tracking system, and wherein the updated usage data satisfies the triggering condition when the tracking device is in possession of the user and moves with the user.

6. The method of claim 1, wherein the updated usage data satisfies the triggering condition when the tracking device moves during a time interval of the one or more time intervals.

7. The method of claim 1, wherein the updated usage data satisfies the triggering condition in response to the tracking device being coupled to an object of a particular object type.

8. A non-transitory computer-readable storage medium storing executable computer instructions that, when executed by a processor, cause the processor to perform steps comprising:
accessing, by a tracking system, usage data corresponding to a tracking device and describing a behavior of the tracking device;

training, by the tracking system, a behavior model corresponding to the tracking device and configured to predict a probability that a tracking device will be moved during each of one or more time intervals based on the accessed usage data; and retraining, by the tracking system, the behavior model in response to receiving updated usage data corresponding to change in behavior of the tracking device, the updated usage data satisfying a triggering condition associated with retraining the behavior model.

9. The non-transitory computer-readable storage medium of claim 8, wherein the behavior model is trained based on timestamped locations of the tracking device during a preceding time interval.

10. The non-transitory computer-readable storage medium of claim 9, wherein the timestamped locations of the tracking device are collected from a location sensor in a mobile device communicatively coupled to the tracking device.

11. The non-transitory computer-readable storage medium of claim 8, wherein the behavior model is trained based on an object descriptor specifying a type of object to which the tracking device is attached.

12. The non-transitory computer-readable storage medium of claim 8, wherein the tracking device belongs to a user of the tracking system, and wherein the updated usage data satisfies the triggering condition when the tracking device is in possession of the user and moves with the user.

13. The non-transitory computer-readable storage medium of claim 8, wherein the updated usage data satisfies the triggering condition when the tracking device moves during a time interval of the one or more time intervals.

14. The non-transitory computer-readable storage medium of claim 8, wherein the updated usage data satisfies the triggering condition in response to the tracking device being coupled to an object of a particular object type.

15. A tracking system comprising:
a processor; and
a non-transitory computer-readable storage medium storing executable computer instructions that, when executed by the processor, cause the processor to perform steps comprising:
accessing, by the tracking system, usage data corresponding to a tracking device and describing a behavior of the tracking device;
training, by the tracking system, a behavior model corresponding to the tracking device and configured to predict a probability that a tracking device will be moved during each of one or more time intervals based on the accessed usage data; and
retraining, by the tracking system, the behavior model in response to receiving updated usage data corresponding to change in behavior of the tracking device, the updated usage data satisfying a triggering condition associated with retraining the behavior model.

16. The system of claim 15, wherein the behavior model is trained based on timestamped locations of the tracking device during a preceding time interval.

17. The system of claim 16, wherein the timestamped locations of the tracking device are collected from a location sensor in a mobile device communicatively coupled to the tracking device.

18. The system of claim 15, wherein the behavior model is trained based on an object descriptor specifying a type of object to which the tracking device is attached.

19. The system of claim 15, wherein the tracking device belongs to a user of the tracking system, and wherein the updated usage data satisfies the triggering condition when the tracking device is in possession of the user and moves with the user.

20. The system of claim 15, wherein the tracking device satisfies the triggering condition when the updated usage data moves during a time interval of the one or more time intervals.

* * * * *